United States Patent
Lango et al.

(10) Patent No.: US 10,896,257 B2
(45) Date of Patent: Jan. 19, 2021

(54) SECURE BOOT OF VIRTUALIZED COMPUTING INSTANCES

(71) Applicant: VMware, Inc., Palo Alto, CA (US)

(72) Inventors: Jason A. Lango, Mountain View, CA (US); Adam Cain, Eugene, OR (US); Nitin Bahadur, Santa Clara, CA (US); John K. Edwards, Sunnyvale, CA (US); Kevin George, San Jose, CA (US); William McGovern, San Jose, CA (US); Andrew G. Tucker, Portola Valley, CA (US)

(73) Assignee: VMware, Inc., Palo Alto, CA (US)

(*) Notice: Subject to any disclaimer, the term of this patent is extended or adjusted under 35 U.S.C. 154(b) by 281 days.

(21) Appl. No.: 15/934,621

(22) Filed: Mar. 23, 2018

(65) Prior Publication Data
US 2018/0373879 A1  Dec. 27, 2018

Related U.S. Application Data

(63) Continuation of application No. 15/633,685, filed on Jun. 26, 2017, now Pat. No. 9,953,168.

(51) Int. Cl.
| | |
|---|---|
| *G06F 21/57* | (2013.01) |
| *H04L 9/08* | (2006.01) |
| *G06F 9/455* | (2018.01) |
| *H04L 29/06* | (2006.01) |
| *H04L 9/32* | (2006.01) |
| *H04L 9/06* | (2006.01) |

(Continued)

(52) U.S. Cl.
CPC .......... *G06F 21/575* (2013.01); *G06F 9/4401* (2013.01); *G06F 9/45545* (2013.01); *G06F 9/45558* (2013.01); *G06F 21/53* (2013.01); *H04L 9/0631* (2013.01); *H04L 9/0822* (2013.01); *H04L 9/3213* (2013.01); *H04L 9/3234* (2013.01); *H04L 9/3268* (2013.01); *H04L 63/0428* (2013.01); *H04L 63/166* (2013.01); *G06F 2009/45562* (2013.01); *G06F 2009/45587* (2013.01)

(58) Field of Classification Search
CPC ............... G06F 9/4401; G06F 9/45545; G06F 9/45558; G06F 21/53; G06F 21/575; G06F 2009/45562; G06F 2009/45587; H04L 9/0631; H04L 9/0822; H04L 9/3213; H04L 9/3234; H04L 9/3268; H04L 63/0428; H04L 63/166

See application file for complete search history.

(56) References Cited

U.S. PATENT DOCUMENTS

| | | | |
|---|---|---|---|
| 7,818,567 B2 * | 10/2010 | Waltermann | G06F 21/6209 713/165 |
| 2011/0154023 A1 | 6/2011 | Smith | |

(Continued)

FOREIGN PATENT DOCUMENTS

EP  1 865 656 A1  12/2007

*Primary Examiner* — Alexander Lagor
*Assistant Examiner* — William B Jones
(74) *Attorney, Agent, or Firm* — Patterson + Sheridan, LLP

(57) ABSTRACT

In an embodiment, a secure boot method comprises writing a wrapped data encryption key (DEK) and a wrapped key encryption key (KEK) onto a label of a wrapped operating system image prior to uploading the wrapped operating system image to a virtual data center using one or more computing devices.

19 Claims, 8 Drawing Sheets

(51) Int. Cl.
*G06F 21/53* (2013.01)
*G06F 9/4401* (2018.01)

(56) References Cited

U.S. PATENT DOCUMENTS

| | | |
|---|---|---|
| 2011/0179444 A1 | 7/2011 | Moon |
| 2012/0179904 A1 | 7/2012 | Dunn |
| 2013/0047149 A1* | 2/2013 | Xu .......................... G06F 21/53 |
| | | 717/175 |
| 2016/0261592 A1 | 9/2016 | Hubert |
| 2017/0177873 A1* | 6/2017 | Raghuram ............ G06F 21/575 |
| 2019/0158281 A1* | 5/2019 | Han .................... G06F 11/1448 |
| 2019/0372758 A1* | 12/2019 | Tevosyan ............... H04L 9/0861 |
| 2019/0394031 A1* | 12/2019 | Deng .................... H04L 9/0643 |
| 2020/0067707 A1* | 2/2020 | Resch ................... H04L 9/0841 |

* cited by examiner

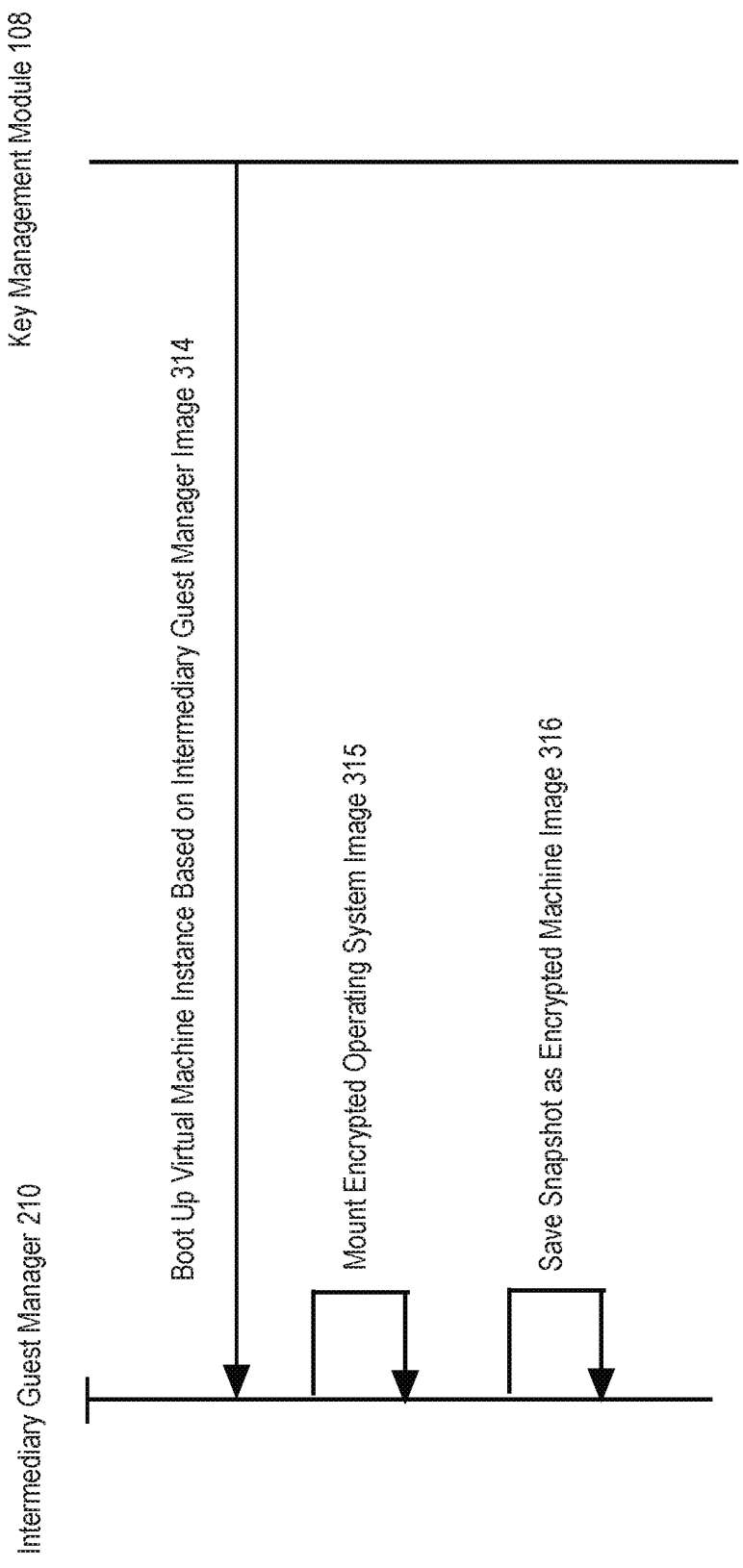

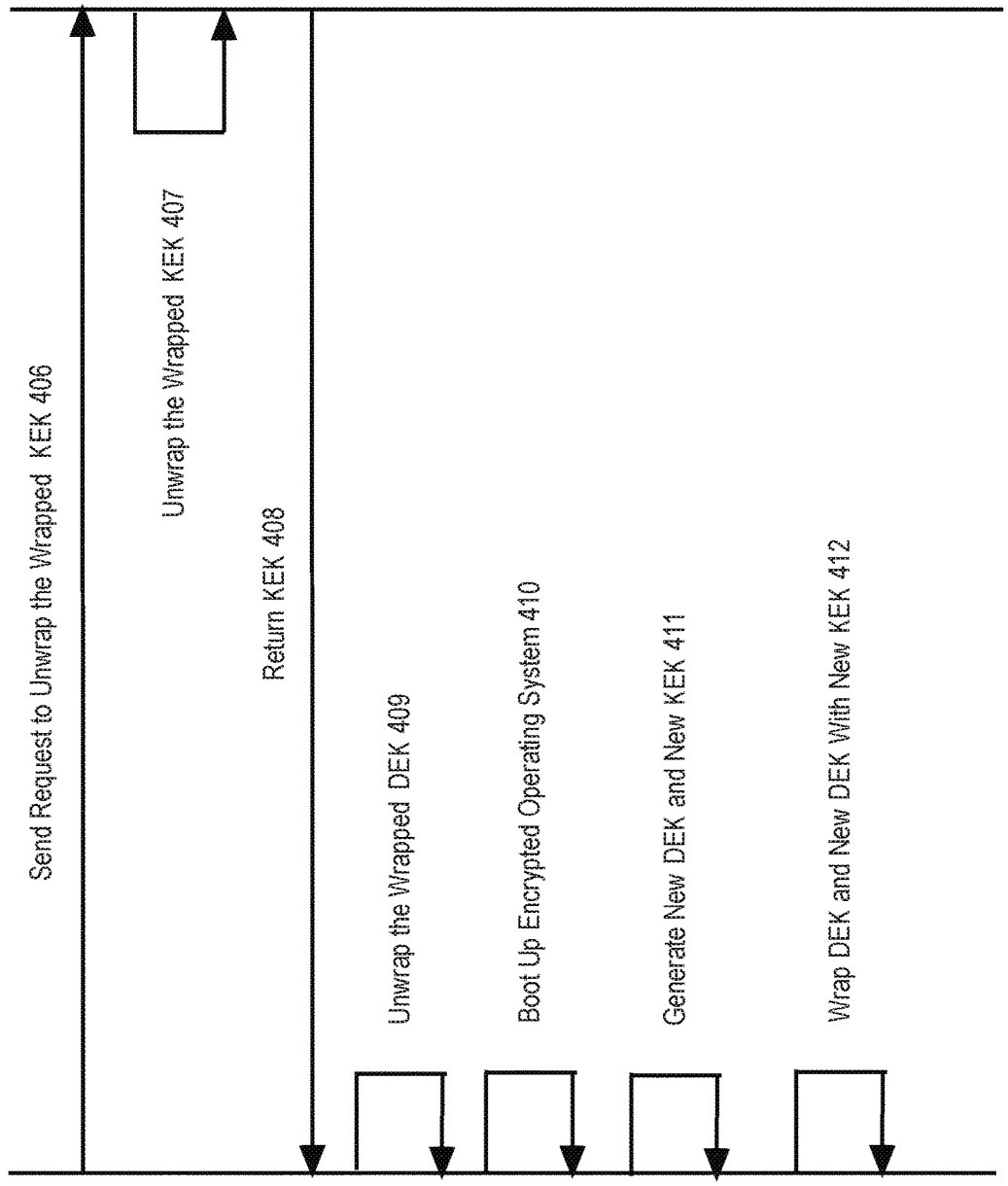

US 10,896,257 B2

SECURE BOOT OF VIRTUALIZED COMPUTING INSTANCES

BENEFIT CLAIM

This application claims the benefit under 35 U.S.C. § 120 as a Continuation of application Ser. No. 15/633,685, filed Jun. 26, 2017, the entire contents of which is hereby incorporated by reference for all purposes as if fully set forth herein. The applicant hereby rescinds any disclaimer of claim scope in the parent application or the prosecution history thereof and advises the USPTO that the claims in this application may be broader than any claim in the parent application.

TECHNICAL FIELD

The present disclosure generally relates to techniques for identifying and countering security threats using an intermediary guest manager that sits between a guest operating system and a hypervisor.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many enterprises and their computer systems utilize virtual machines provided by a virtual data center (VDC), such as a cloud service provider (CSP), and other virtualized resources, such as virtual storage, virtual computing resources, or virtual database resources that are accessible through the Internet. Such cloud services may provide a client with many benefits, such as reduced costs, easier scalability, and a reduced administrative burden. However, cloud services also pose new challenges for clients of these services, such as increased security risks. For example, one such risk is that when a customer uses a CSP to boot up an instance of a guest operating system in a VDC the customer data processed by that instance becomes exposed to security breaches on the part of the CSP. While many enterprises have security systems in place on their own on-premises devices, these protections do not extend into the cloud. Should the CSP become compromised, sensitive data such as user passwords, social security numbers, credit card numbers, and so forth relied upon by customer applications may become exposed.

In some cases, CSPs have implemented features which allow operating system images and data disks to be encrypted within the VDC through a key management system operated by the CSP. Thus, when stored on disk (or other non-volatile storage), the operating system image remains encrypted thus protecting the data held by the image from being copied and deciphered by unauthorized agents. When the customer requires an instance to be booted up, the CSP uses the encryption keys to decrypt memory blocks of the operating system image when read into RAM (or other volatile memory) to execute the operating system. Unfortunately, these systems require the customer to place a significant amount of trust on the CSP to hold and secure the encryption keys, otherwise the sensitive data of the customer may once again face significant risk of exposure. Thus, customer computing systems may benefit from a technique that allows data held on a VDC to be secured while requiring only a minimal amount of trust to be placed on the part of the CSP.

SUMMARY OF THE INVENTION

The appended claims may serve to summarize the invention.

BRIEF DESCRIPTION OF THE DRAWINGS

In the drawings:
FIG. 3A, FIG. 3B, FIG. 3C illustrate a process flow for generating an encrypted machine image in an embodiment.
FIG. 4A, FIG. 4B illustrate a process flow for launching a virtual machine instance from an encrypted machine image account to an embodiment.

DESCRIPTION OF EXAMPLE EMBODIMENTS

Figure 1:
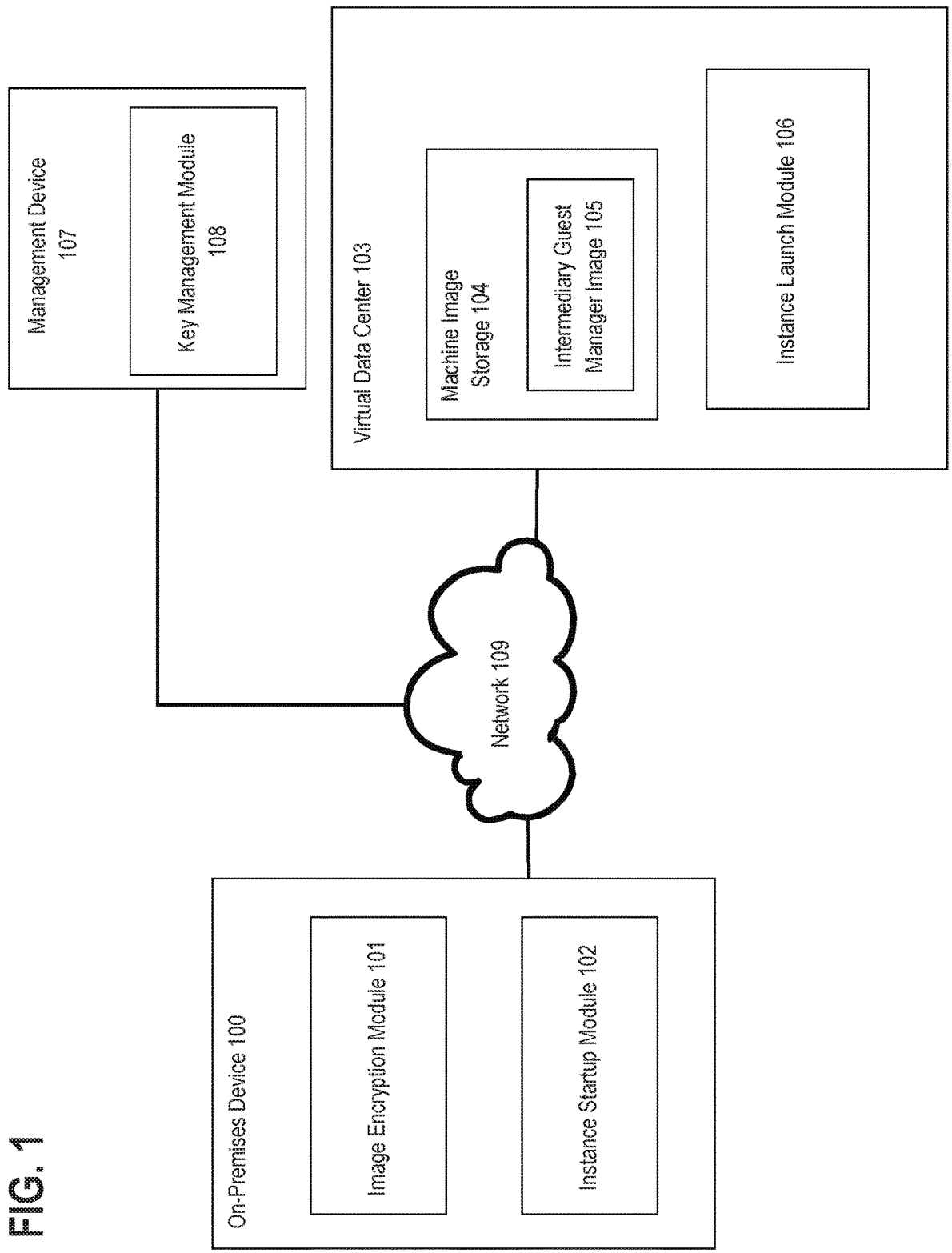
FIG. 1 illustrates an example networked computer system arrangement that may be used to implement an embodiment.

Methods for expanding security services for a guest of a virtual data center are described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:
  1.0 General Overview
  2.0 Example Operating Environment
  3.0 Virtual Machine Overview
  4.0 Generating an Encrypted Machine Image
  5.0 Launching a Virtual Machine Instance from an Encrypted Machine Image
  6.0 Implementation Mechanisms—Hardware Overview
  7.0 Extensions and Alternatives
  1.0 General Overview In an embodiment, a secure boot process is performed over two phases, a first phase which generates an encrypted machine image and a second phase which boots from the encrypted machine image. Other embodiments may separate the secure boot process into more than two phases or combine the procedure into a single phase. However, to provide a clear description the two-phase embodiment has been chosen as the representative example. In the following description brackets { } are used to denote an encrypted/wrapped data item, such as a key or image. Thus, if data item E is wrapped with key K the result is represented as $\{E\}_K$.

In an embodiment, during the first phase an on-premises device receives an operating system image (OSI) which will be used as the guest OS booted on a virtual machine instance of the VDC. For example, the on-premises device may execute the operating system temporarily on-site and take a snapshot of the guest OS as an image which is then fed as input to a script or software module which executes the steps of the first phase of the secure boot process. Upon receiving the OSI, the on-premises device generates a data encryption key (DEK) and a key encryption key (KEK). In an embodiment, the data volumes of the OSI are encrypted using the DEK. Additionally or alternatively, the DEK may be used to wrap the operating system image to produce an encrypted operating system image, $\{OSI\}_{DEK}$. In addition, the DEK is wrapped with the KEK to produce a wrapped DEK, $\{DEK\}_{KEK}$.

To protect the KEK, the on-premises device establishes a secure connection to a management device which hosts a key management service and which holds an account root key (ARK) for the customer/enterprise of the on-premises device. For example, this may be accomplished through sharing a client certificate and setting up a Transport Layer Security (TLS) connection. Once the secure connection is established, the on-premises device sends a request to the management device to wrap the KEK using the account root key. In response, the on-premises device wraps the KEK using the account root key to produce $\{KEK\}_{ARK}$ and sends $\{KEK\}_{ARK}$ back to the on-premises device. The on-premises device then writes the wrapped DEK, $\{DEK\}_{KEK}$, and the wrapped KEK, $\{KEK\}_{ARK}$, onto the label of the encrypted operating system image $\{OSI\}_{DEK}$ and uploads $\{OSI\}_{DEK}$ to the VDC.

In an embodiment, the KEK is used to wrap a DEK, in part, to facilitate future updates or changes in the encryption key. For example, the KEK may be based upon a user password or some other information that may be updated by a user. Rather than requiring the OSI to be re-encrypted (which could require a significant amount of time if the image is very large) instead only the DEK needs to be re-encrypted under the new KEK. Since the DEK is typically small in relation to the size of the OSI, this results in a far more efficient re-keying operation.

Furthermore, one reason that the account root key is used to wrap the KEK is because the account root key remains secured by the management device and is never sent across the network either in the clear or in encrypted form. Instead, the key remains in the management device and is used to encrypt other data items on-site by the management device with only the resulting encrypted data items being passed over the networks, thus reducing risk that the account root key could be revealed or deciphered by malicious actors. The account root key may also be secured by the management device via anti-tampering hardware, such as hardware security modules (HSMs). Furthermore, although the management device is described as separate from the on-premises device and the VDC, this is an implementation detail and not a requirement. Other embodiments may include an on-premises device that includes a key-management service that manages an account root key or alternatively a VDC which has an instance executed by a trusted third party which acts as a virtual management device which runs the key management service.

In an embodiment, the VDC in addition to storing $\{OSI\}_{DEK}$ also stores a library of images which can be used to boot up virtual machine instances including an image representing an intermediary guest manager. An intermediary guest manager is a component of a virtual machine that rests between guest operating systems of the virtual machine and the hypervisor of the virtual machine. The intermediary guest manager provides services to the guest operating systems, typically by intercepting requests for resources (such as system calls and page table updates), processing/optimizing the requests, and then effectuating the requests by making hypercalls into the hypervisor. In addition, the intermediary guest manager may provide conflict resolution in cases where multiple guest operating systems are running within the same virtual machine and request resources that can only be held by one agent at a time. The default image of the intermediary guest manager is one which has no underlying guest operating systems mounted. However, the intermediary guest manager is configured to receive metadata at boot-up specifying an image to mount as a guest OS (for example, as a root volume) before saving a snapshot of the instance as a "merged" image. This merged image (intermediary guest manager+mounted encrypted guest OS) represents the encrypted machine image which is the result of the first phase. Thus, after $\{OSI\}_{DEK}$ is uploaded to and stored by the VDC, the on-premises device sends a request to the VDC to boot up an instance using the image of the intermediary guest manager. In this case, the request specifies an ID corresponding to the image of the intermediary guest manager and provides metadata identifying the ID or storage location of the encrypted operating system image $\{OSI\}_{DEK}$ in addition to any other metadata that an embodiment may find useful to "bake into" the resulting image, such as Certificate Authority certificates, signed token information, authentication data, and so forth. The encrypted machine image is then stored by the VDC to later produce virtual machine instances upon request by the on-premises device.

In an embodiment, during the second phase the on-premises device sends a request to the VDC to boot up a virtual machine instance based on the encrypted machine image produced by the first phase. For example, the on-premises may receive a command from an administrator or an application that causes the on-premises device to send a request to the VDC to boot up an instance based on an ID corresponding to the encrypted machine image produced at the end of the first phase. Upon booting up, the intermediary guest manager establishes a secure connection with the management device (for example, using client certificates and/or TLS). Once the secure connection is established, the intermediary guest manager sends a request to unwrap $\{KEK\}_{ARK}$, receiving in return KEK. The intermediary guest manager then uses the KEK to unwrap $\{DEK\}_{KEK}$ to receive DEK. With the DEK, the intermediary guest manager then boots the encrypted guest OS image $\{OSI\}_{DEK}$. When the intermediary guest manager reads the data blocks of the encrypted guest OS image from non-volatile storage into memory, the DEK is then used to obtain the clear text of those data blocks (via software, hardware, or combination means) for processing. In addition, to secure new root volume data the intermediary guest manager generates a new data encryption key $DEK_{new}$ and a new key encryption key $KEK_{new}$. The intermediary guest manager then wraps $DEK_{new}$ with $KEK_{new}$ and DEK with KEK for the root volume. $KEK_{new}$ may be handled in a similar manner as KEK. One benefit to encrypting new root volume data under a new key ($DEK_{new}$) (which is then secured using $KEK_{new}$) rather than the original DEK is to ensure that the new data written by each instance generated from the encrypted machine image is protected from a potential attacker with possession of the DEK and/or the KEK, such as an agent on a rogue secure instance that was launched from the same encrypted machine image.

Since the plaintext keys DEK, KEK, and the decrypted data blocks of $\{OSI\}_{DEK}$ are only maintained by the intermediary guest manager in volatile memory (for example, RAM) the level of trust that the enterprise puts on the VDC is only to protect volatile memory from intrusion and snapshots. Since most reputable CSPs provide assurances that the infrastructure of the VDC protects at least against snapshots of memory, this is a level of trust that enterprises are generally comfortable placing on a CSP. However, since the CSP never has access to the plaintext of the keys or the customer data in any permanent form, the risk of exposure is greatly minimized in the event of a security breach on the part of the CSP.

2.0 Example Operating Environment

FIG. 1 illustrates an example networked computer system arrangement that may be used to implement an embodiment.

In FIG. 1, an on-premises device 100 represents a computer system hosted by a customer or enterprise who intends to execute a guest operating system on virtual data center 103. In some embodiments, the on-premises device 100 represents a secure location that is hosted by the customer or enterprise and is referred to as a "trust anchor". The techniques discussed herein use encryption and key management techniques to extend the trust anchor around the virtual data center 103 to provide protections to the guest operating system. Although on-premises device 100 is referred to in the singular, in other embodiments the on-premises device 100 may represent a collection of multiple devices hosting on the premises on the customer or enterprise. The on-premises device may comprise one or more processors, non-volatile storage (for example, disk drives), volatile storage (for example, RAM), databases, intra-networks, networking sub-devices, and so forth. In some embodiments, the on-premises device 100 may be implemented using the components described below in Section 6.0 "Implementation Mechanisms—Hardware Overview".

In an embodiment, the on-premises device 100 includes one or more modules, including the image encryption module 101 and the instance startup module 102, which perform various functions. The modules of the on-premises device 100 may be implemented by software executing on the on-premises device 100, hardware components of the on-premises device 100, or combinations thereof. However, for the following explanations, the modules are described in terms of logic for performing functions associated with each of the respective modules. In some embodiments, the modules may represent instructions or scripts which when executed perform the tasks and/or responsibilities associated with each respective module.

In an embodiment, the image encryption module 101 represents logic within the on-premises device 100 that produces an encrypted version of an operating system image. For example, the image encryption module 101 may represent the logic of the first phase described above in Section 1.0 "General Overview". In some embodiments, the image encryption module 101 takes as input an operating system image and produces a DEK which is then used to wrap the operating system image. In addition, the image encryption module generates a KEK which is used to wrap the DEK. To protect the KEK, the image encryption module 101 establishes a secure channel with the key management module 108 of the management device 107. Using the secure channel, the image encryption module 101 then sends a request to the key management module 108 to wrap the KEK with the account root key associated with the customer/enterprise and return the result back to the image encryption module 101. Upon receiving the wrapped KEK, the image encryption module 101 writes the wrapped KEK and the wrapped DEK onto the label of the encrypted operating system image and uploads the encrypted operating system to the virtual data center 103.

After the virtual data center 103 has stored the encrypted operating system image in machine image storage 104 the image encryption module 101 sends a request to the instance launch module 106 of the virtual data center 103 to start up a temporary instance using the intermediary guest manager image 105 and supplying metadata identifying the encrypted operating system image. This request causes the instance launch module 106 to generate a virtual machine instance using the intermediary guest manager image 105. The intermediary guest manager, upon being booted on the generated instance, mounts the encrypted operating system image (for example, as a guest root drive) and then saves a snapshot of the state of the virtual machine. This snapshot represents a merged image which is the intermediary guest manager with a mounted encrypted guest operating system which is referred to herein as an "encrypted machine image".

In some embodiments, the image encryption module 101 may merge multiple encrypted guest operating systems into the same encrypted machine image. This represents a scenario in which the intermediary guest manager manages multiple operating systems simultaneously. In some embodiments, the image encryption module 101 receives as input two or more operating system images, encrypts both under separate DEKs, creates respective KEKs to wrap the DEKs, and then consults the key management module 108 to wrap the KEKs using the account root key. The wrapped DEKs and KEKs are then written onto the label of the drives of the respective encrypted operating system images. Furthermore, when the image encryption module 101 sends metadata along with the command to create the temporary instance using the image of the intermediary guest manager, the metadata may identify each encrypted operating system image stored in the machine image storage 104 which will be mounted as a drive under the intermediary guest manager. Thus, in this case, the encrypted machine image includes both the intermediary guest manager and multiple encrypted guest operating systems.

In an embodiment, the instance startup module 102 represents logic within the on-premises device that causes the virtual data center 103 to start up an instance based on an encrypted machine image produced by the image encryption module 101. For example, the instance startup module 102 may represent the logic of the second phase described above in Section 1.0 "General Overview". In some embodiments, the instance startup module 102 receives a command from an administrator or application that requests an instance to be generated on the virtual data center 103 for the encrypted machine image. In response to receiving the command, the instance startup module 102 sends a request that identifies the encrypted operating system image to the instance launch module 106 of the virtual data center 103 to start up a virtual machine instance. The instance launch module 106 generates a virtual machine instance based on the encrypted machine image which passes control over to the intermediary guest manager of the newly created instance. The intermediary guest manager establishes a secure connection to the key management module 108 of the management device 107. After the secure connection is established the intermediary guest manager sends a request to unwrap the wrapped KEK to the key management module 108 and receives in response the unwrapped KEK. Using the KEK the intermediary guest manager unwraps the DEK and uses the DEK to boot up the encrypted guest operating system. In addition, the intermediary guest manager generates a new DEK with which to wrap new root volume data and generates a new KEK with which to wrap both the original DEK and the new DEK for the root guest volume. The new KEK is handled in a similar manner as the original KEK.

In an embodiment, the virtual data center 103 represents a collection of computer systems and storage systems that are configured to execute virtual machine instances which host guest operating systems. For example, virtual data center 103 may represent a VDC executing a cloud service such as Amazon Web Services, Google Cloud, and so forth. In some embodiments, virtual data center 103 includes machine image storage 104 which stores machine images which represent templates of virtual machines which may be executed as virtual machine instances. The machine image storage 104 broadly represents storage using any of a plurality of different kinds of data storage systems, such as cloud storage, a NAS system, a SAN system, or a set of one or more non-volatile storage devices, such as a collection of hard drive disks. As one of the template images, the machine image storage 104 includes intermediary guest manager image 105 which represents the machine image for the intermediary guest manager. In addition, the virtual data center 103 includes instance launch module 106 which represents logic for launching instances based on a given machine image. For example, the instance launch module 106 may receive requests which identify a particular machine image, such as by ID number or by storage location within the machine image storage 104, reserves resources within the virtual data center 103 to launch the instance, and then boots up the instance based on the stored image. In some embodiments, the instance launch module 106 may also receive metadata along with the request which is passed on to the component within the machine image responsible for booting up guest operating systems (for example, the intermediary guest manager).

In an embodiment, management device 107 represents a computer system hosted by a trusted third party that maintains a store of account root keys for one or more customers (including the customer of the on-premises device 100) and runs a key management service represented by the key management module 108. For example, the management device 107 may be hosted by the developer of the intermediary guest manager or other trusted third party. The management device 107 may comprise one or more processors, non-volatile storage (for example, disk drives), volatile storage (for example, RAM), databases, intra-networks, networking sub-devices, and so forth. In some embodiments, the on-premises device 100 may be implemented using the components described below in Section 6.0 Implementation Mechanisms—Hardware Overview.

In some embodiments, the key management module 108 communicates using a key management protocol, such as Key Management Interoperability Protocol (KMIP). However, in other embodiments, the protocol used by the key management module 108 may represent an "off-the-shelf" or customized key management service which uses a proxy service as a wrapper which provides additional functionality. For example, the key management module 108 may require different requests for identifying the key belonging to a particular ID number, wrapping data with a key using the particular ID number, and returning the wrapped data. The proxy service may combine the processing steps described above into one command, to reduce the number of communications sent over the network 109. In some embodiments, the proxy service may also be responsible for securing communications and/or authenticating communication partners for the key management module 108 prior to utilizing the key management module 108 to carry out requests. For example, assuming the communications are secured using TLS, the proxy service built on top of the key management module 108 may provide and/or receive certificates to authenticate the communicating parties. However, in other embodiments the functionality of the proxy may be built into the key management module 108 itself.

In other embodiments, the management device 107 may be maintained on-premises or combined into the on-premises device 100. Furthermore, in still other embodiments, the management device 107 may be replaced with a virtualized instance running on the virtual data center 103, where this instance is a virtual machine upon which the key management module 108 executes. In such embodiments, the means of communication between the key management module 108 and the image encryption module 101/intermediary guest manager may differ from the case where the management device 107 is separate. For example, if the key management module 108 is executing within the on-premises device 100 a request may be made through an inter-process communication mechanism that does not require transport over network 109.

In an embodiment, the network 109 represents any combination of one or more local networks, wide area networks, or internetworks. Data exchanged over the networks may be transferred using any number of network layer protocols, such as Internet Protocol (IP), Multiprotocol Label Switching (MPLS), Asynchronous Transfer Mode (ATM), Frame Relay, and so forth. Furthermore, in embodiments where the networks represent a combination of multiple sub-networks, different network layer protocols may be used at each of the underlying sub-networks. In some embodiments network 109 represents the Internet.

2.0 Example Virtual Machine

Figure 2:
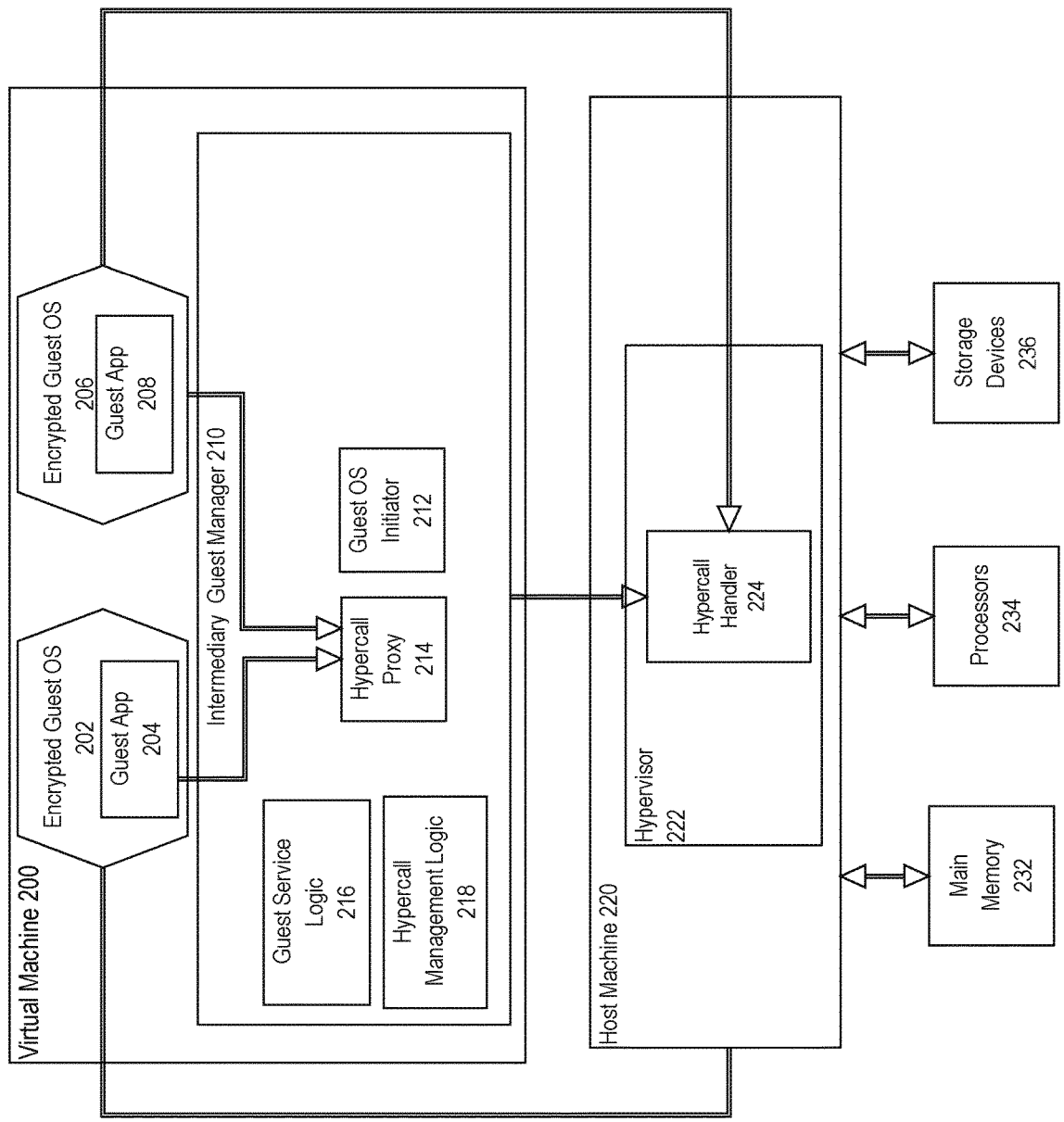
FIG. 2 illustrates an example virtual machine instance that may be launched on a virtual data center.

FIG. 2 illustrates an example virtual machine instance that may be launched on a virtual data center. FIG. 2 represents a view of an instance of a virtual machine 200 executing within the virtual data center 103 in response to the instance launch module 106 receiving a request to launch an instance from the instance startup module 102 using an encrypted machine image generated by the image encryption module 101. In FIG. 2, the guest OS 202, 206 have data blocks that are encrypted. However, when read into volatile memory (for example, RAM) by the intermediary guest manager, the DEK(s) obtained during the second phase are used to decrypt the data blocks and obtain the clear-text for processing. The decryption may be performed in software or may be aided by a specialized hardware component, such as a hardware security module (HSM), or a combination of both software and specialized hardware components.

Virtual machine 200 is a virtual machine hosted by host machine 220 residing within virtual data center 103 and managed by hypervisor 222. Guest OS 202, 206 are guest operating systems within virtual machine 200. Guest OS 202, 206 may utilize hardware resources of host machine 220 or other VDC-provided resources. Resources of host machine 220 may be virtualized for a single guest, virtual machine 200, at least partially with the assistance of hypervisor 222. Encrypted guest OS 202 and 206 may not be separate virtual machines. For example, there may be no CPU virtualization, strict memory segmentation, or memory protection between guest OS 202 and 206. Other embodiments may include only a single guest operating system or may include more than two guest operating systems.

Guest OS 202 and 206 host guest applications (guest app) 204 and 208. A client may control processes on guest OS 202 and 206 such as guest apps 204 and 208, at a client location that is remote from the location of host machine 220, such as the on-premises device 100. Guest apps 204, 208 may initiate various hypercalls and/or various system calls. Hypercalls, as used herein, include requests directed to hypervisor 222 of host machine 220, such as requests to access main memory 232, processors 234, storage devices 236, and request to utilize various VDC-provided resources such as VDC storage resources, VDC database resources, and VDC computing resources. System calls, as used herein, include requests by applications of guest OS 202 and 206 (such as guest applications 204 and 208) to start up processes, terminate processes, perform file reads and/or writes, access the scheduler, access network resources, and so forth. A system call is a programmatic way in which applications/computer programs request a service from the kernel of the OS upon which they are executing. However, in this case, rather than being executed solely by the guest OS, the system calls may be intercepted by the intermediary guest manager 210.

Hypercalls generally require the guest OS to have knowledge of the virtualized environment and thus be configured to make hypercalls to the hypervisor 222. In FIG. 2, guest OS 202, 206 are assumed to have the capability of issuing hypercalls directly to the hypervisor. However, in other embodiments, guest OS 202, 206 may not be paravirtualized and therefore may not be aware of the virtualized environment, so that guest OS 202, 206 may not be able to make hypercalls. Instead, in such environments, the intermediary guest manager 210 intercepts the system calls made by the guest applications 204, 208 through traps and then emulates the effect of those system calls by making hypercalls to the hypervisor 222, emulating the system call itself, or a combination of both. Furthermore, in some embodiments, the intermediary guest manager 210 may intercept system calls and hypercalls of even a paravirtualized guest OS. For example, there may be cases where the hypervisor is configured to assume that guest OS 202, 206 are not aware of the hypervisor and do not make hypercalls. In such embodiments, the intermediary guest manager 210 may intercept the hypercalls made by the guest OS 202, 206 and emulate those hypercalls by performing the task itself or converting the hypercalls to a communications format expected by the hypervisor 222. As another example, the intermediary guest manager 210 may be configured to provide optimizations which require the system calls and hypercalls to be intercepted and processed before being forwarded (potentially after being transformed and/or aggregated) to the hypervisor 222. In addition, intercepting the system calls and/or hypercalls allows the intermediary guest manager 210 to implement features which otherwise would not be available to the guest OS through the hypervisor 222.

Guest OS 202, 206 may be managed, at least in part, by intermediary guest manager 210. Intermediary guest manager 210 may comprise logic for enhancing security of guest OS 202, 206. Intermediary guest manager 210 may include one or more of guest OS initiator 212, hypercall proxy 214, guest service logic 216, or hypercall management logic 218. Guest OS initiator 212 initiates guest operating systems, such as guest OS 202, 206. Hypercall proxy 214 intercepts hypercalls from guest app 204 or guest app 208 that may be directed to hypervisor 222. Guest service logic 216 comprises instructions for performing one or more guest services that enhance guest utilization of VDC resources. Hypercall management logic 218 comprises instructions for managing hypercalls, such as instructions for ensuring that utilization of memory by guest OS 202, 206 does not interfere with utilization of memory by intermediary guest manager 210. Furthermore, the operation of the logical elements specified above could be affected or improved by communication with the management device 107. For example, certain components on the intermediary guest manager 105 and the management device 107 may use a communication channel to send detected events to the management device 107 and receive action instructions. Example action instructions may specify to shut down the guest OS once a particular threat is detected. The management device is the entity that manages policies determining, for instance, what threats should be detected and what actions should be taken when each threat is detected.

Intermediary guest manager 210 may operate on a different type of operating system than guest OS 202 and/or guest OS 206. Guest OS 202 and 206 may also be different types of operating systems in some embodiments.

Hypervisor 222 within host machine 220 may comprise hypercall handler 224. Hypercall handler 224 may receive calls from guest OS 202, 206 and/or intermediary guest manager 210. Host machine 220 may be communicatively coupled to main memory 232, processors 234, and/or storage devices 236. Guest app 204, 208 within guest OS 202, 206 may utilize main memory 232, processor 234, and/or storage devices 236. Hypercalls handled by hypercall handler 224 may request utilization of main memory 232, processors 234, and/or storage devices 236.

Hypervisor 222 of FIG. 1 may present a software interface for communicating various hypercalls to the hypervisor, which may be used by processes within virtual machine 200. For example, hypervisor 222 may be a XEN hypervisor and guest OS 202, 206, and/or intermediary guest manager 210 may issue hypercalls to hypervisor 222 by sending a hypercall. XEN is currently developed by the Xen.org community.

Hypervisor 222 may not be notified of the separate guest operating systems within virtual machine 200 and may not sub-partition virtual machine 200 resources to create separate partitions for intermediary guest manager 210 or and/or other guest operating system(s). Hypervisor 222 may interpret calls received from the plurality of guest operating systems and/or from intermediary guest manager 210 to be from a single guest through the manipulation of the intermediary guest manager 210.

3.0 Generating An Encrypted Machine Image

Figure 3A:
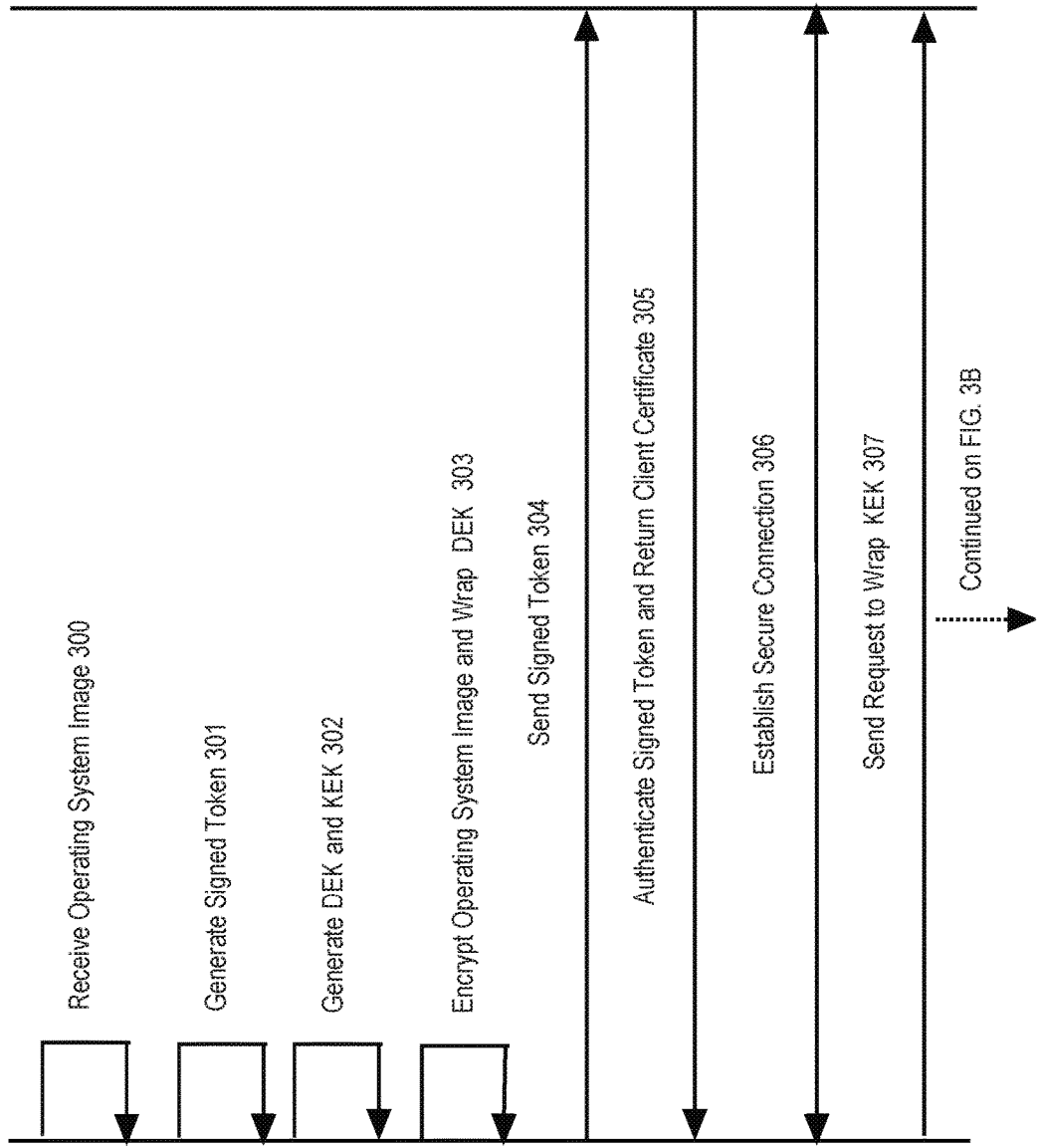
Figure 3B:
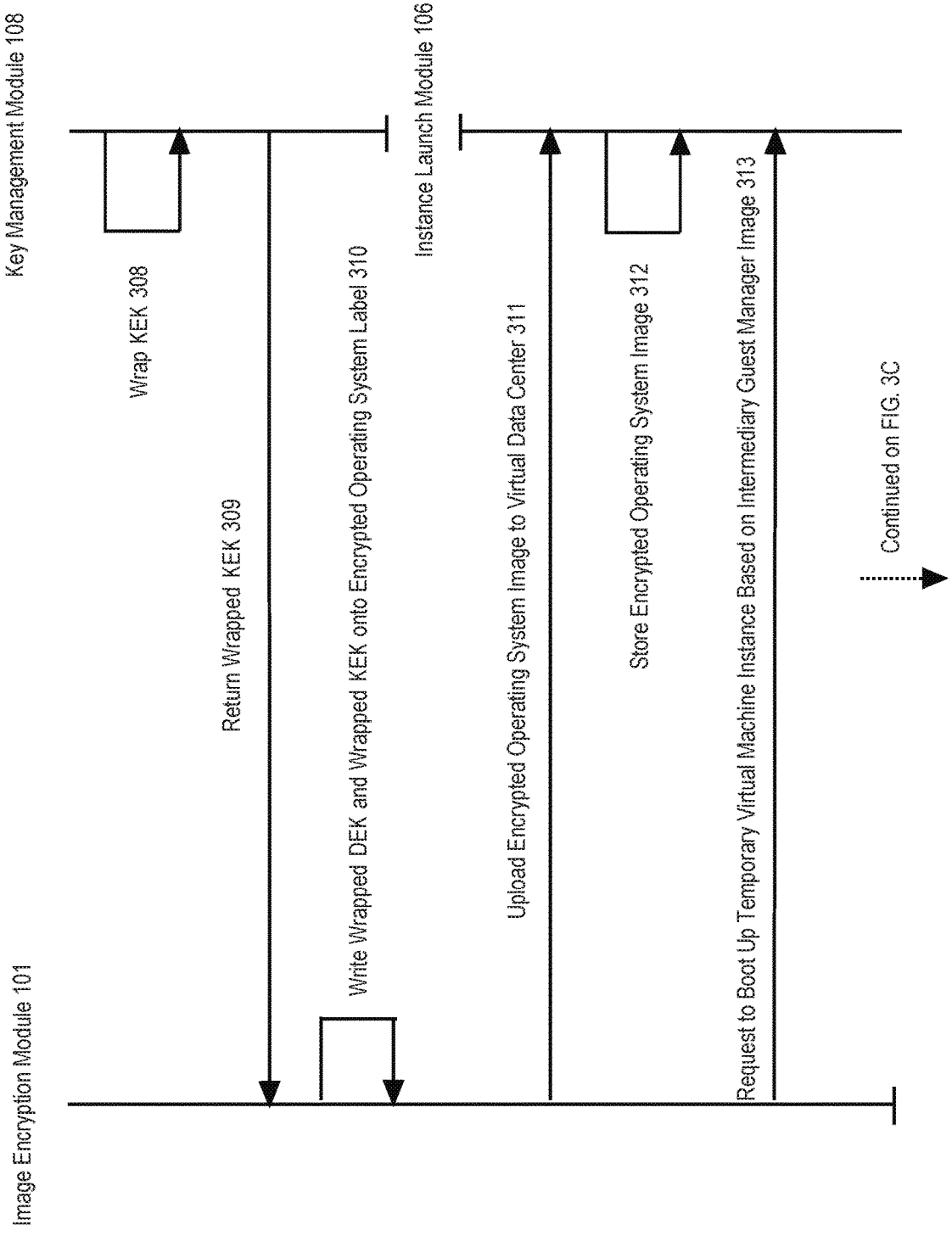

FIG. 3A, FIG. 3B, FIG. 3C illustrate a process flow for generating an encrypted machine image in an embodiment. In FIG. 3A, FIG. 3B, FIG. 3C the components participating in the process are assumed to be the image encryption module 101 of the on-premises device 100, the key management module 108 of the management device 107, the instance launch module 106 of the virtual data center 103, and the intermediary guest manager 210 of the virtual machine 200 generated by the instance launch module 106. Although the process flow shows specific steps and/or communications between the participants, other embodiments may add steps/communications, remove steps/communications, combine steps/communications, and so forth compared to the diagram of FIG. 3A, FIG. 3B, FIG. 3C. Furthermore, FIG. 3A, FIG. 3B, FIG. 3C illustrate the creation of an encrypted machine image that includes only a single guest operating system that is managed by the intermediary guest manager 210. However, the process flow illustrated in FIG. 3A, FIG. 3B, FIG. 3C may be expanded to any arbitrary number of guest operating systems by generating a separate DEK and KEK for each guest operating system image and providing the intermediary guest manager 210 with metadata identifying the encrypted operating system images to mount when generating the encrypted machine image, thus causing the intermediary guest manager 210 to mount the encrypted operating systems identified as guests.

In FIG. 3A, at step 300, the image encryption module 101 receives an image of an operating system to encrypt. For example, the image encryption module 101 may accept a command that identifies a storage location of the operating system image within a storage sub-device (not depicted in FIG. 1) attached, within, or accessible to the on-premises device 100. However, in other embodiments, the image encryption module 101 may start up a temporary virtual machine which executes the operating system and then saves a snapshot of the operating system as the image received at step 300.

At step 301, the image encryption module 101 generates a signed token containing information with which to authenticate to the key management module 108. For example, the token may be a JSON Web Token (JWT) containing information that securely identifies the user or customer account of the encryption module 101 to the key management module 108. In some embodiments, the token includes an expiration time that is chosen to reduce the potential for misuse. In some embodiments, the key management module 108 is configured to verify tokens generated by the image encryption module 101. For example, the on-premises device 100 may register a public key used to sign the tokens ahead of time with the key management module 108, which can then be used to verify the authenticity of the token.

At step 302, the image encryption module 101 generates a DEK with which to encrypt the operating system image and a KEK with which to wrap the DEK. The size of the DEK and the KEK are dependent upon the encryption technique used to encrypt the operating system image and wrap the DEK. For example, the DEK and the KEK may be 128 bits, 192 bits, 256 bits, and so forth without limitation. The process of generating the DEK and the KEK may be random, such as by making use of a cryptographically secure pseudo-random number generator. However, one of both keys may also be based wholly or partially on authentication information such as a password dictated by a user.

At step 303, the image encryption module 101 uses the DEK to encrypt the operating system image to produce $\{OSI\}_{DEK}$ and wraps the DEK with the KEK to produce $\{DEK\}_{KEK}$. In an embodiment, the encryption technique used to encrypt the operating system image and wrap the DEK is 256-bit Advanced Encryption Standard (AES) in Galios/Counter Mode (GCM). However, other encryption techniques such as DES, other variations of AES, RSA, Blowfish, and so forth may also be used. In some embodiments, the encryption technique used to encrypt the operating system image differs from the technique used to wrap the KEK. However, in other embodiments, the same encryption technique may be used for both.

At step 304, the image encryption module 101 sends the token generated at step 301 to the key management module 108 as a form of authentication.

At step 305, the key management module 108 authenticates the token and sends a newly-generated keypair and client certificate to the image encryption module 101. In an embodiment, the token includes metadata that identifies the algorithm used to sign the token (for example, generate the message authentication code (MAC) used as a signature to the token). To authenticate the token the key management module 108 may use the payload of the token and the public key used to sign the JWT as input to the specified algorithm and compare the results to authenticate the token. If the authentication is successful, the key management module 108 sends a newly-generated keypair and client certificate back to the image encryption module 101 that includes the public key of the key management module 108.

In an embodiment, the image encryption module 101 generates the keypair and sends a certificate signing request along with the JWT to the key management module 108. If the authentication is successful, the key management module 108 sends the client certificate back to the image encryption module 101.

At step 306, the image encryption module 101 establishes a secure connection to the key management module 108. In some embodiments, the image encryption module 101 establishes a secure connection the key management module 108 using TLS and the client certificate obtained at step 305. For example, a variation of TLS that uses 384-bit EC ciphersuites with 256-bit AES may be used to secure the connection. However, other secure communication protocols that utilize encryption to send protected messages, such as the Secure Socket Layer (SSL), may also be used to establish a secure connection.

At step 307, the image encryption module 101 sends the KEK to the key management module 108 with a request to wrap the KEK using the account root key belonging to the on-premises device 100. For example, the key management module 108 may have access to a key store that is part of or accessible to management device 107 (not depicted in FIG. 1) that stores account root keys for a variety of different customers. The request may include a user name/password to identify which account root key to use to wrap the KEK. Alternatively, the key store may maintain a mapping between public keys used to sign JWTs and account root keys belonging to the signer of the JWT, which can be used to identify the proper account root key. In other embodiments, the image encryption module 101 may first send a request to the key management module 108 asking for the ID number of its own account root key within the key store. In response, the image encryption module 101 looks up the ID of the account root key belonging to the customer/enterprise of the on-premises device 100 and returns that ID to the image encryption module 101. The image encryption module 101 then sends the KEK to the key management module 108 with a wrap request that contains the ID of the account root key within the key store.

In FIG. 3B, at step 308, the key management module 108 wraps the KEK using the account root key and returns the wrapped KEK, $\{KEK\}_{ARK}$ to the image encryption module 101. In an embodiment, the key management module 108 uses AES as the encryption algorithm to wrap the KEK. However, in other embodiments other encryption algorithms may also be used for this purpose.

At step 309, the key management module 108 returns the wrapped KEK, $\{KEK\}_{ARK}$ to the image encryption module 101.

At step 310, the image encryption module 101 writes the wrapped DEK, $\{DEK\}_{KEK}$ and the wrapped KEK, $\{KEK\}_{ARK}$, onto the label of the encrypted operating system image $\{OSI\}_{DEK}$. In some embodiments where the account root key is identified with an ID number, the data blocks holding $\{KEK\}_{ARK}$ also contain the ID of the account root key. This ID number can be used as a sanity check during the second phase where after decryption the ID number can be compared to the known ID number of the account root key to verify that the decryption was successful. However, other embodiments may use encryption techniques which utilize a cryptographic checksum to verify that decryption was performed successfully. In some embodiments, the token generated at step 301 is also written into the intermediary guest manager image 105. This may be considered an optimization which allows the intermediary guest manager 210 to establish a secure connection to the key management module 108 without necessarily needing to be furnished with a new token. However, other embodiments may omit writing the token onto the label and supply the token as metadata when the instance is launched during the second phase.

At step 311, the image encryption module 101 uploads the encrypted operating system image $\{OSI\}_{DEK}$ to the instance launch module 106 of the virtual data center 103.

At step 312, the instance launch module 106 stores the encrypted operating system image $\{OSI\}_{DEK}$ in the machine image storage 104. In some embodiments, the virtual data center 103 returns an ID number for the stored $\{OSI\}_{DEK}$ or a storage location within machine image storage 104 where $\{OSI\}_{DEK}$ may be located.

At step 313, the image encryption module 101 sends a request to the instance launch module 106 specifying to boot up a temporary virtual machine, the request identifies the machine image for the intermediary guest manager 210 and provides metadata that identifies the encrypted machine image $\{OSI\}_{DEK}$. In some embodiments, the machine image for the intermediary guest manager 210 may be identified by a particular ID number or storage location within the machine image storage 104 which the image encryption module 101 includes in the request. In some embodiments, the metadata may identify the encrypted machine image $\{OSI\}_{DEK}$ by the ID or storage location returned to the image encryption module 101 after block 312.

In FIG. 3C, at step 314, the instance launch module 106 boots up a default virtual machine based on the image of the intermediary guest manager 210. The term "default" is used to describe the virtual machine booted up at 314 since the initial virtual machine has an intermediary guest manager 210 with no underlying guest operating systems. In some embodiments, the instance launch module 106 in the process of booting up the virtual machine based on the intermediary guest manager 210 provides the metadata included in the request to the intermediary guest manager 210 upon execution.

At step 315, the intermediary guest manager 210 mounts the encrypted operating system $\{OSI\}_{DEK}$ as a guest operating system. In an embodiment, the intermediary guest manager 210 mounts the encrypted guest operating system $\{OSI\}_{DEK}$ as a root volume.

At step 316, the intermediary guest manager 210 saves a snapshot of the temporary virtual machine as the encrypted machine image. The encrypted machine image represents a merging of the intermediary guest manager 210 upon which the encrypted guest operating system $\{OSI\}_{DEK}$ has been mounted as a root volume. Thus, upon being executed from the encrypted machine image, the intermediary guest manager 210 is configured to perform the second stage described below in Section 4.0 "Launching a Virtual Machine Instance from an Encrypted Machine Image" using $\{OSI\}_{DEK}$ as the guest operating system.

4.0 Launching a Virtual Machine Instance from an Encrypted Machine Image

Figure 4A:
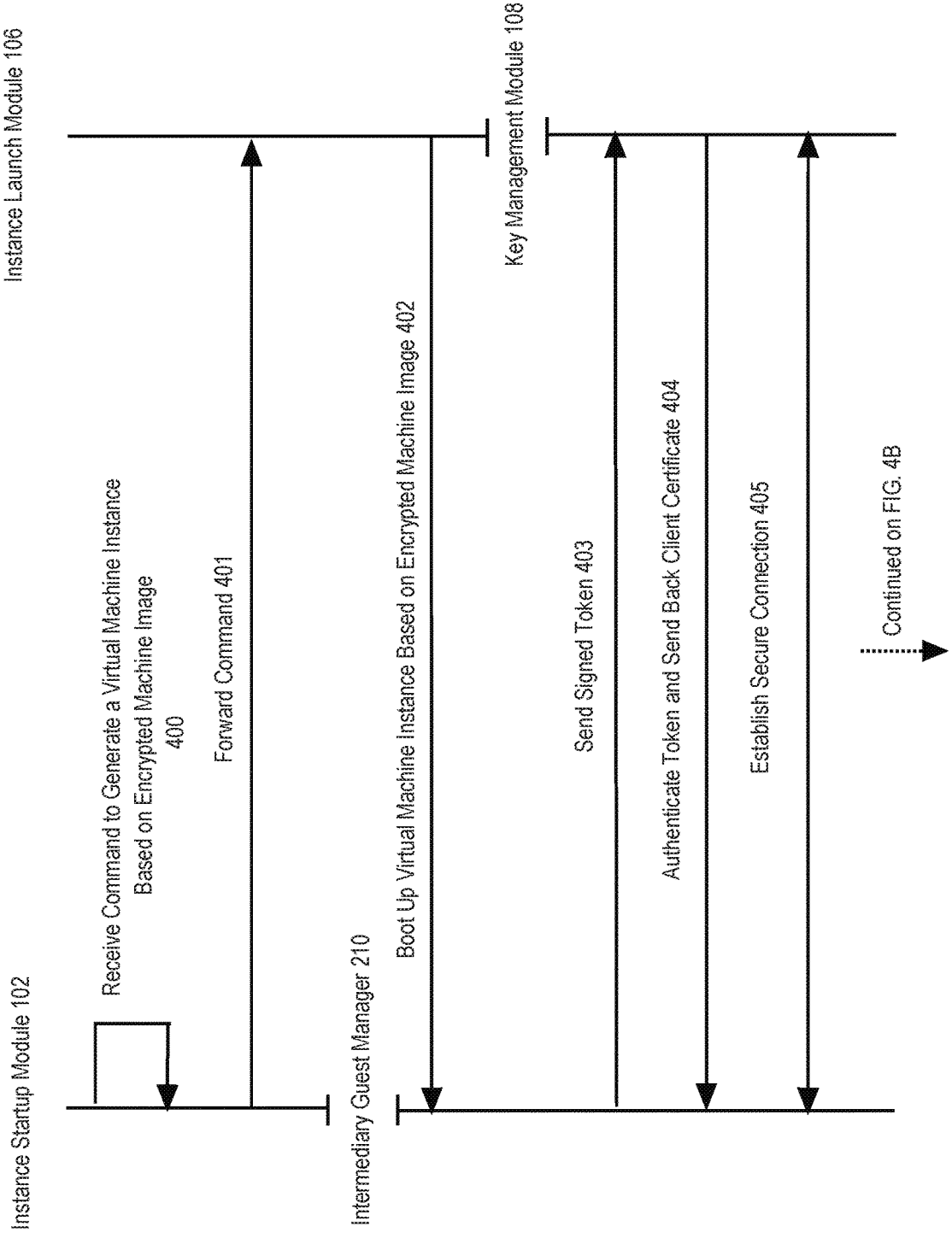

FIG. 4A, FIG. 4B illustrates a process flow for launching a virtual machine instance from an encrypted machine image account to an embodiment. In FIG. 4A, FIG. 4B, the components participating in the process are assumed to be the instance startup module 102 of the on-premises device 100, the key management module 108 of the management device 107, the instance launch module 106 of the virtual data center 103, and the intermediary guest manager 210 of the virtual machine 200 generated by the instance launch module 106. Although the process flow shows specific steps and/or communications between the participants, other embodiments may add steps/communications, remove steps/communications, combine steps/communications, and so forth compared to the diagram of FIG. 4A, FIG. 4B. Furthermore, FIG. 4A, FIG. 4B illustrate the launch process of an encrypted machine image that includes only a single guest operating system that is managed by the intermediary guest manager 210. However, the process flow illustrated in FIG. 4A, FIG. 4B may be expanded to any arbitrary number of guest operating systems by unwrapping the respective wrapped KEKs for each mounted operating system via the key management module 108, using the unwrapped KEKs to unwrap the corresponding DEKs, and launching each guest OS using the corresponding unwrapped DEK.

In FIG. 4A, at step 400, the instance startup module 102 receives a command to cause the virtual data center 103 to start up a virtual machine instance based on an encrypted machine image. In some embodiments, the command identifies the encrypted machine image by ID number or storage location associated with the encrypted machine image within the machine image storage 104. In some embodiments, the command causes the instance startup module 102 to generate a token that the intermediary guest manager 210 can use to authenticate with the key management module 108. However, other embodiments may rely upon a token embedded in the intermediary guest manager image 105. The command may be received from another application (for example, through an API supported by the image encryption module 101), a command line interface, a graphical user interface, and so forth.

At step 401, instance startup module 102 forwards the command to the instance launch module 106. In some embodiments, the instance startup module 102 may reformat the command to a format expected by the instance launch module 106. For example, the token may be identified by storage location in the original command received at step 401, but may be converted into a command that includes the token itself or sends the token concurrently with the command to the instance launch module 106 as metadata to be supplied to the intermediary guest manager 210.

At step 402, the instance launch module 106 boots up a virtual machine 200 instance based on the encrypted machine image. In the process of booting up the virtual machine 200 instance the instance launch module 106 executes the intermediary guest manager 210 and supplies the intermediary guest manager 210 with the metadata provided by the instance startup module 102 (if any exists).

At step 403, the intermediary guest manager 210 sends a token authenticating itself to the key management module 108. In some embodiments, the token sent at step 403 is the token embedded into the intermediary guest manager image 105 during phase 1. However, if the token was not written into the intermediary guest manager image 105 or if the embedded token is overwritten by a token supplied by the instance startup module 102, the token sent at step 403 may instead be the token identified in the command at step 400.

At step 404, the key management module 108 in response to receiving the token and authenticating the token sends a client certificate back to the intermediary guest manager 210.

At step 405, the intermediary guest manager 210 establishes a secure connection to the key management module 108. In some embodiments, the intermediary guest manager 210 establishes a secure connection the key management module 108 using TLS and the client certificate obtained at step 305. For example, a variation of TLS that uses 384-bit EC ciphersuites with 256-bit AES may be used to secure the connection. However, other secure communication protocols such as the Secure Socket Layer (SSL), the predecessor of TLS, may also be used to establish a secure connection.

In FIG. 4B, at step 406, the intermediary guest manager 210 sends a request to the key management module 108 to unwrap the wrapped KEK, $\{KEK\}_{ARK}$. In some embodiments, the intermediary guest manager 210 first queries the key management module 108 to obtain the ID of the account root key. In response, the key management module 108 performs a lookup into the key store and returns the ID of the key belonging to the customer/enterprise to which the virtual machine 200 instance belongs. As an optional sanity check, assuming the embodiment wrote the ID of the account root key onto the data blocks of the $\{KEK\}_{ARK}$, the ID of the key returned by the key management module 108 may be compared to the ID imprinted on the data blocks to ensure that both match, otherwise an error has occurred. The intermediary guest manager 210 then sends a request that includes the wrapped KEK and the ID of the account root key to the key management module 108 to perform an unwrap operation.

At step 407, key management module 108 receives the request and unwraps the $\{KEK\}_{ARK}$ using the account root key.

At step 408, the key management module 108 returns the unwrapped KEK back to the intermediary guest manager 210.

At step 409, the intermediary guest manager 210 uses the KEK to unwrap $\{DEK\}_{KEK}$.

At step 410, the intermediary guest manager 210 uses the unwrapped DEK to boot up the guest operating system represented by the mounted encrypted operating system image $\{OSI\}_{DEK}$.

At step 411, the intermediary guest manager generates a new DEK and a new KEK for new root volume data.

At step 412, the intermediary guest manager wraps both the original DEK and the new DEK with the new KEK. The new KEK may be wrapped with a new ARK in the same manner as the original KEK. When new root volume data is produced by the instance, the new root volume data is encrypted using the new DEK. One advantage to encrypting new root volume data under a new key ($DEK_{new}$) rather than the original DEK to ensure that the new data written by each instance generated from the encrypted machine image is protected from a potential attacker with possession of the DEK and/or the KEK (e.g. an agent on a "rogue secure instance" launched from the same encrypted machine image).

In some embodiments, if the instance of the virtual machine 200 is launched with a data volume, the intermediary guest manager 210 performs additional steps for the data volume. The additional steps include generating a DEK for the new data volume and a KEK with which to wrap the DEK, referred to as $DEK_{DATA}$ and $KEK_{DATA}$ respectively. The intermediary guest manager 210 then wraps $DEK_{DATA}$ using $KEK_{DATA}$ and sends a request to the key management module 108 through the secure channel to wrap $KEK_{DATA}$ with the account root key. The key management module 108 upon receiving the request wraps $KEK_{DATA}$ with the account root key and returns $\{KEK_{DATA}\}_{ARK}$. The intermediary guest manager 210 then writes the wrapped $DEK_{DATA}$ and the wrapped $KEK_{DATA}$ onto the label of the data volume.

6.0 Implementation Mechanisms—Hardware Overview

Figure 5:
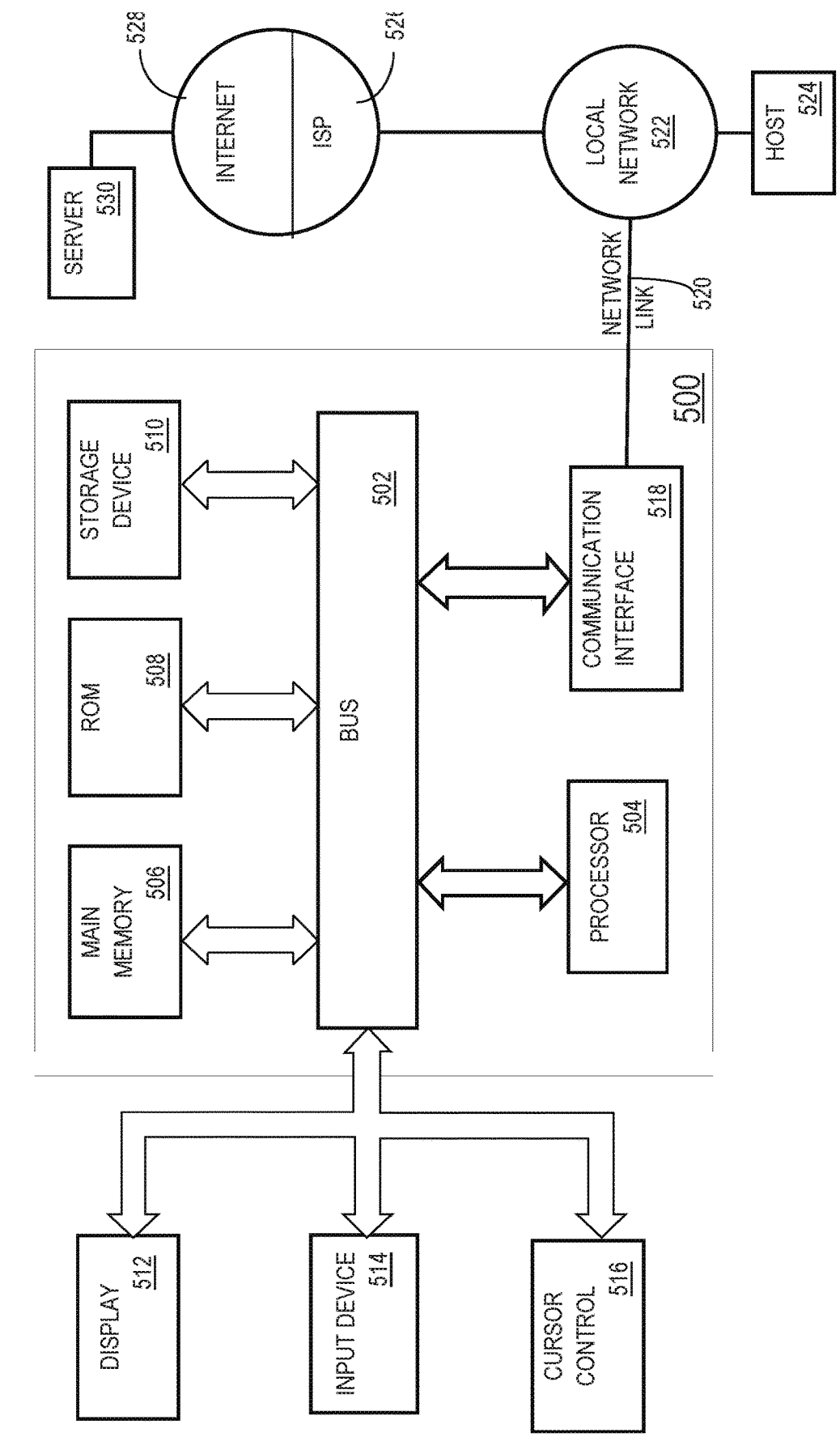
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

The invention is related to the use of computer system 500 for implementing the techniques described herein. In one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network using wireless routers, cable modems, or other interfaces to satellite, wired broadband or cable network systems, and wireless networking signals. The computer system 500 may receive the data over the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for a client device, comprising:
    encrypting, at the client device, an operating system image under a data encryption key (DEK) to generate a wrapped operating system image;
    encrypting the DEK under a key encryption key (KEK) to generate a wrapped DEK;
    transmitting the KEK to a key management server to encrypt the KEK under an account root key of the key management server to generate a wrapped KEK; and
    after receiving the wrapped KEK from the key management service, transmitting the wrapped DEK, the wrapped KEK, and the wrapped operating system image from the client device to a virtual data center, wherein the virtual data center subsequently:
        sends a decryption request to the key management server, the decryption request including the wrapped KEK;
        receives a response from the key management server that includes the KEK;
        unwraps the wrapped DEK using the KEK to obtain the DEK; and
        boots up a guest operating system using the DEK.

2. The method of claim 1, wherein
    the virtual data center further generates an encrypted machine image by merging the wrapped operating system image with an intermediary guest manager machine image to boot up the guest operating system.

3. The method of claim 2, wherein the virtual data center generates the encrypted machine image based on:
    booting up a temporary instance from the intermediary guest manager machine image;
    mounting the wrapped operating system image as a guest drive of an intermediary guest manager; and
    storing a snapshot of the temporary instance as the encrypted machine image.

4. The method of claim 1, wherein
    an intermediary guest manager running in the virtual data center performs steps of sending the decryption request, receiving the response, unwrapping the wrapped DEK and booting up the guest operating system.

5. The method of claim 4, wherein the intermediary guest manager does not store the KEK or the DEK in persistent storage of the virtual data center.

6. The method of claim 4, further comprising:
    generating, by the intermediary guest manager, a different DEK for new root volume data produced during execution of the instance;
    generating, by the intermediary guest manager, a different KEK; and
    wrapping, by the intermediary guest manager, the DEK and the different DEK using the different KEK.

7. The method of claim 1, wherein the virtual data center further:
    launches an instance with one or more data volumes;
    generates a data volume DEK and a data volume KEK;
    wraps the data volume DEK with the data volume KEK to produce a wrapped data volume DEK;
    sends an encryption request to the key management server to wrap the data volume KEK with an account root key;

receives a wrapped data volume KEK that has been wrapped with the account root key from key management server; and writes the wrapped data volume DEK and the wrapped data volume KEK to the data volume.

8. A non-transitory computer-readable storage medium storing instructions which, when executed by one or more processors of a client device, cause:

encrypting, at the client device, an operating system image under a data encryption key (DEK) to generate a wrapped operating system image;

encrypting the DEK under a key encryption key (KEK) to generate a wrapped DEK;

transmitting the KEK to a key management service to encrypt the KEK under an account root key of the key management server to generate a wrapped KEK; and after receiving the wrapped KEK from the key management service, transmitting the wrapped DEK, the wrapped KEK, and the wrapped operating system image from the client device to a virtual data center, wherein the virtual data center subsequently:

sends a decryption request to the key management server, the decryption request including the wrapped KEK;

receives a response from the key management server that includes the KEK;

unwraps the wrapped DEK using the KEK to obtain the DEK; and boots up a guest operating system using the DEK.

9. The non-transitory computer-readable storage medium of claim 8, wherein the virtual data center further generates an encrypted machine image by merging the wrapped operating system image with an intermediary guest manager machine image to boot up the guest operating system.

10. The non-transitory computer-readable storage medium of claim 9, wherein transmitting the KEK is based on:

establishing a secure connection to the key management service.

11. The non-transitory computer-readable storage medium of claim 9, wherein an intermediary guest manager running in the virtual data center performs steps of sending the decryption request, receiving the response, unwrapping the wrapped DEK and booting up the guest operating system.

12. The non-transitory computer-readable storage medium of claim 11, storing instructions which, when executed by one or more processors, cause:

generating, by the intermediary guest manager, a different DEK for new root volume data produced during execution of the instance;

generating, by the intermediary guest manager, a different KEK; and wrapping, by the intermediary guest manager, the DEK and the different DEK using the different KEK.

13. The non-transitory computer-readable storage medium of claim 9, wherein the virtual data center generates the encrypted machine image based on:

booting up a temporary instance from the intermediary guest manager machine image;

mounting the wrapped system image as a guest drive of an intermediary guest manager; and storing a snapshot of the temporary instance as the encrypted machine image.

14. The non-transitory computer-readable storage medium of claim 8, wherein the virtual data center further:

launches an instance with one or more data volumes;

generates a data volume DEK and a data volume KEK;

wraps the data volume DEK with the data volume KEK to produce a wrapped data volume DEK;

sends an encryption request to the key management service to wrap the data volume KEK with the account root key;

receives a wrapped data volume KEK that has been wrapped with the account root key from key management service; and writes the wrapped data volume DEK and the wrapped data volume KEK to the data volume.

15. A computer system, comprising:

an on-premises device having one or more processors and storage media storing first instructions for execution by the one or more processors of the on-premises device;

a virtual data center having one or more processors and storage media storing second instructions for execution by the virtual data center;

wherein the on-premises device is communicatively coupled to the virtual data center by a data network;

wherein the first instructions are configured for:

encrypting an operating system image under a data encryption key (DEK) to generate a wrapped operating system image;

encrypting the DEK under a key encryption key (KEK) to generate a wrapped DEK;

transmitting the KEK to a key management service to encrypt the KEK under an account root key of the key management server to generate a wrapped KEK;

receiving the wrapped KEK from the key management service; and transmitting, through the data network, the wrapped DEK, the wrapped KEK, and the wrapped operating system to the virtual data center, wherein the virtual data center subsequently uses the wrapped DEK and the wrapped KEK to decrypt the wrapped operating system image;

wherein the second instructions are configured for:

sending a decryption request to the key management server, the decryption request including the wrapped KEK;

receiving a response from the key management server that includes the KEK;

unwrapping the wrapped DEK using the KEK to obtain the DEK;

generating an encrypted machine image by merging the wrapped system image with an intermediary guest manager machine image; and booting up a guest operating system using the DEK and the encrypted machine image.

16. The computer system of claim 15, wherein an intermediary guest manager running in the virtual data center performs steps of sending the decryption request, receiving the response, unwrapping the wrapped DEK, generating the encrypted machine image, and booting up the guest operating system.

17. The computer system of claim 16, wherein the second instructions are further configured for:

generating, by the intermediary guest manager, a different DEK for new root volume data produced during execution of the instance;

generating, by the intermediary guest manager, a different KEK; and wrapping, by the intermediary guest manager, the DEK and the different DEK using the different KEK.

18. The computer system of claim 15, wherein the second instructions are further configured for:
- launching an instance with one or more data volumes;
- generating a data volume DEK and a data volume KEK;
- wrapping the data volume DEK with the data volume KEK to produce a wrapped data volume DEK;
- sending an encryption request to the key management service to wrap the data volume KEK with an account root key;
- receiving a wrapped data volume KEK that has been wrapped with the account root key from the key management service; and
- writing the wrapped data volume DEK and the wrapped data volume KEK to the data volume.

19. The computer system of claim 15, wherein the second instructions are further configured for:
- booting up a temporary instance from the intermediary guest manager machine image;
- mounting the wrapped system image as a guest drive of an intermediary guest manager; and
- storing a snapshot of the temporary instance as the encrypted machine image.

* * * * *